(12) United States Patent
Yosui et al.

(10) Patent No.: US 10,867,765 B2
(45) Date of Patent: Dec. 15, 2020

(54) ACTUATOR

(71) Applicant: Murata Manufacturing Co., Ltd., Nagaokakyo (JP)

(72) Inventors: Kuniaki Yosui, Nagaokakyo (JP); Shingo Ito, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 149 days.

(21) Appl. No.: 16/297,766

(22) Filed: Mar. 11, 2019

(65) Prior Publication Data
US 2019/0206648 A1    Jul. 4, 2019

Related U.S. Application Data

(63) Continuation of application No. PCT/JP2018/028388, filed on Jul. 30, 2018.

(30) Foreign Application Priority Data

Aug. 2, 2017  (JP) .................................. 2017-149573

(51) Int. Cl.
*H01H 50/44*      (2006.01)
*H02K 41/03*      (2006.01)
*H02K 11/33*      (2016.01)
*H02K 3/26*       (2006.01)

(52) U.S. Cl.
CPC ......... *H01H 50/443* (2013.01); *H02K 41/031* (2013.01); *H02K 3/26* (2013.01); *H02K 11/33* (2016.01)

(58) Field of Classification Search
CPC .... H01H 50/443; H02K 41/031; H02K 11/33; H02K 3/26
See application file for complete search history.

(56) References Cited

U.S. PATENT DOCUMENTS

2011/0063059 A1* 3/2011 Takahashi ................ H02K 1/34
                                                    335/306
2016/0012950 A1   1/2016 Nishino et al.

FOREIGN PATENT DOCUMENTS

| JP | 2010-89061 A   | 4/2010  |
| JP | 2016-191849 A  | 11/2016 |
| WO | 2011/148678 A1 | 12/2011 |
| WO | 2015/079773 A1 | 6/2015  |

OTHER PUBLICATIONS

Official Communication issued in Japanese Patent Application No. 2018-557440, dated Feb. 12, 2019.
Official Communication issued in International Patent Application No. PCT/JP2018/028388, dated Oct. 16, 2018.

* cited by examiner

Primary Examiner — Mohamad A Musleh
(74) Attorney, Agent, or Firm — Keating & Bennett, LLP

(57) ABSTRACT

An actuator includes a coil substrate including a coil, a base substrate including insulating base layers that are stacked, capacitors disposed in the base substrate, and a magnet to receive a magnetic field from the coil. The base substrate includes a coil driving circuit, and a first region closer to the coil and a second region farther from the coil. The first and second regions are defined by two portions of the base substrate divided in a direction in which the insulating base layers are stacked. The capacitors are disposed in the first region more densely than in the second region.

16 Claims, 8 Drawing Sheets

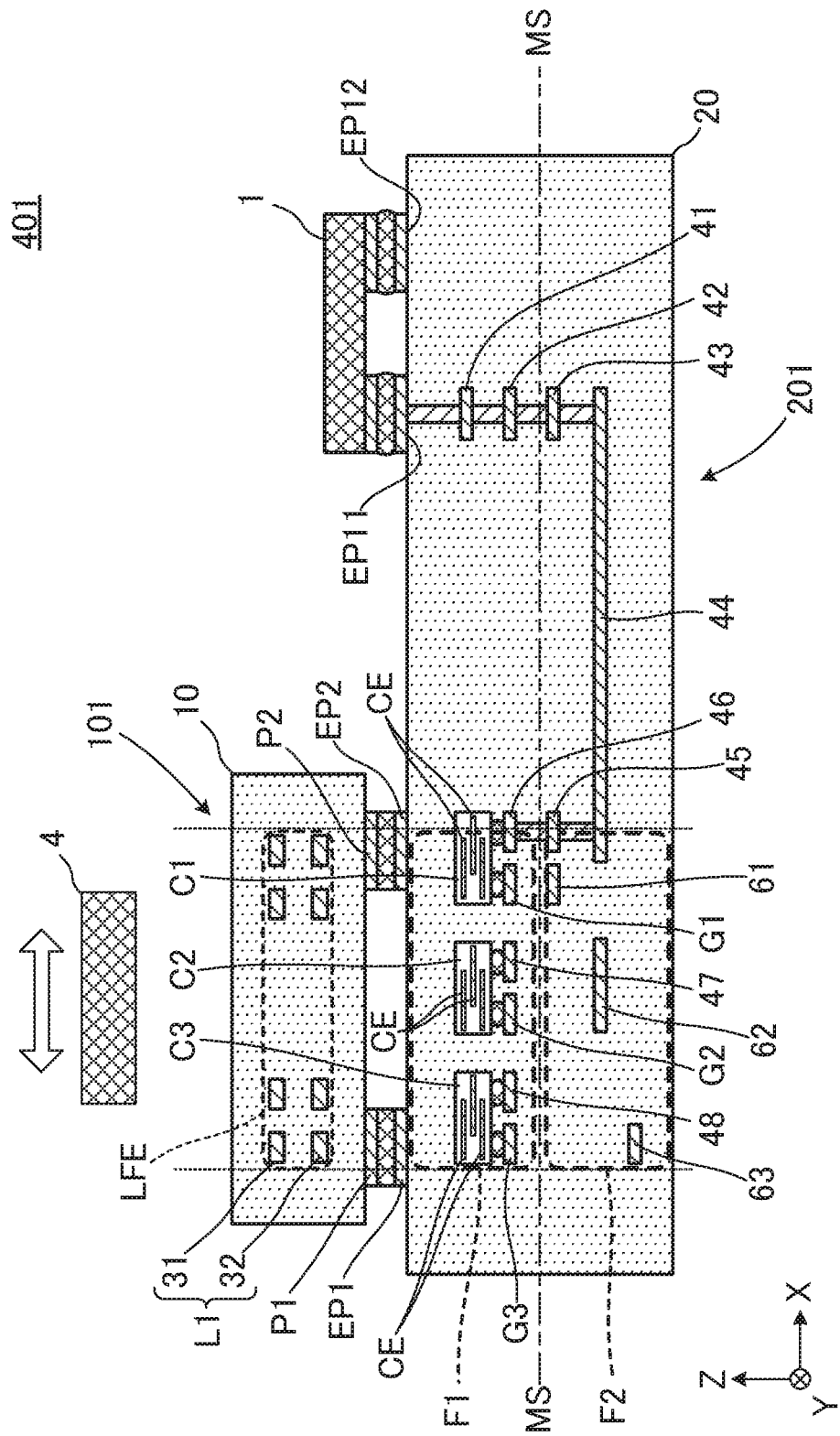

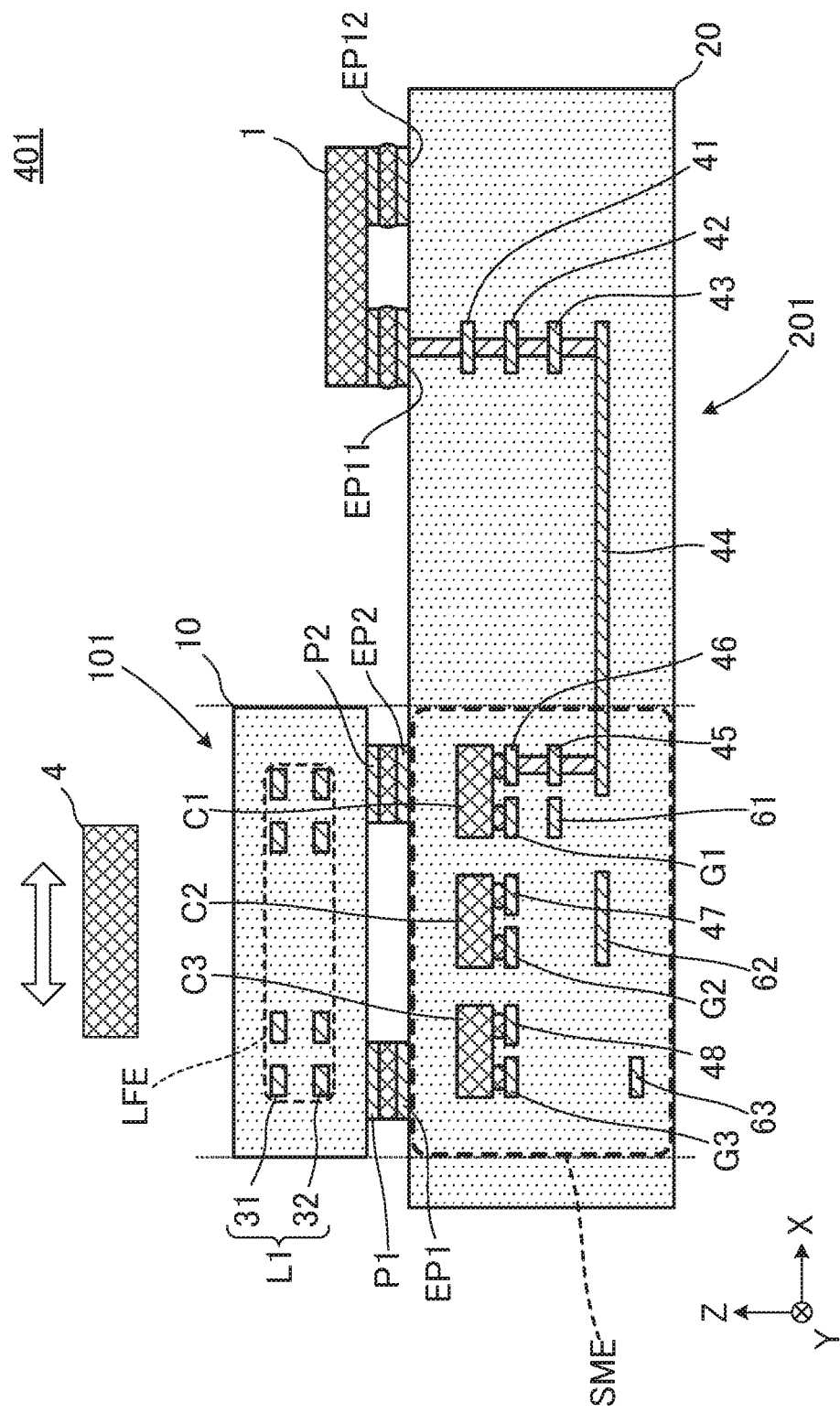

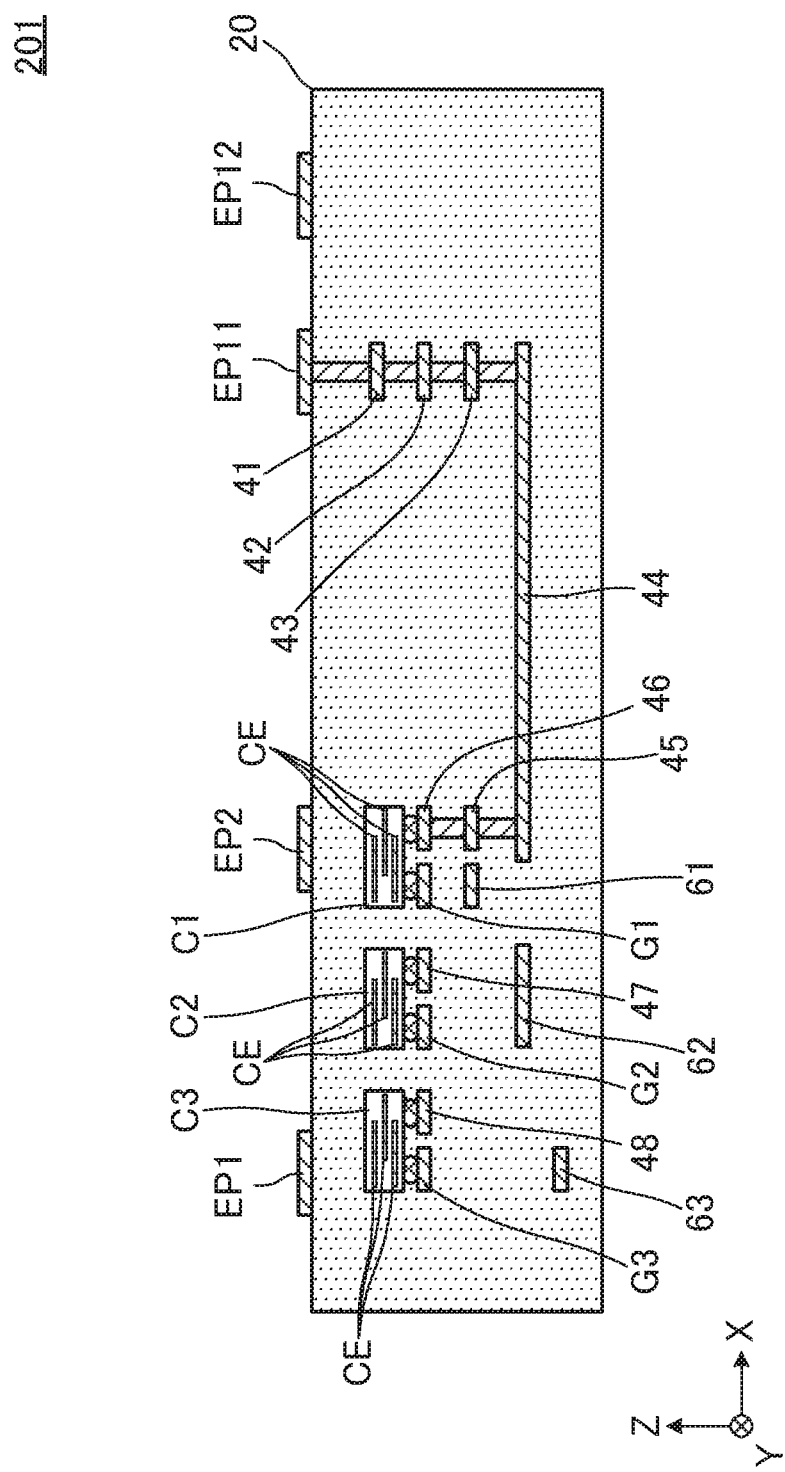

Fig.5
(1)
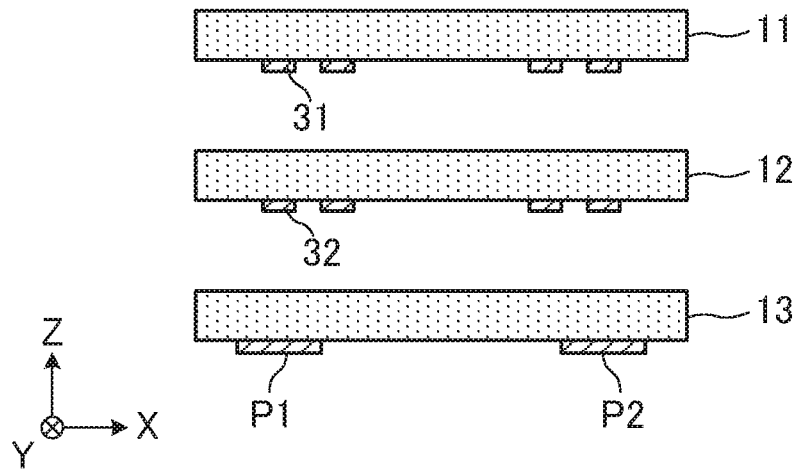
(2)
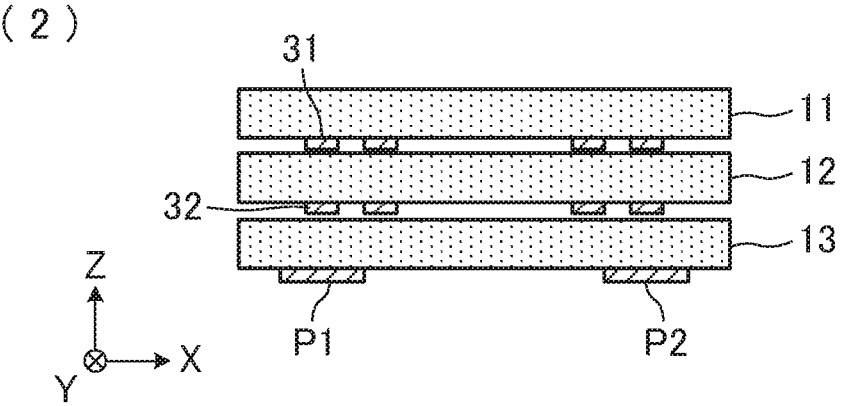
(3)
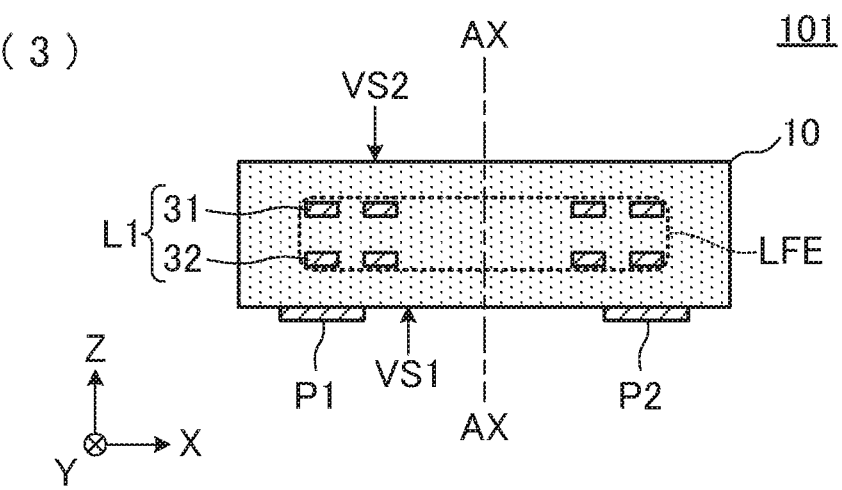

Fig.6
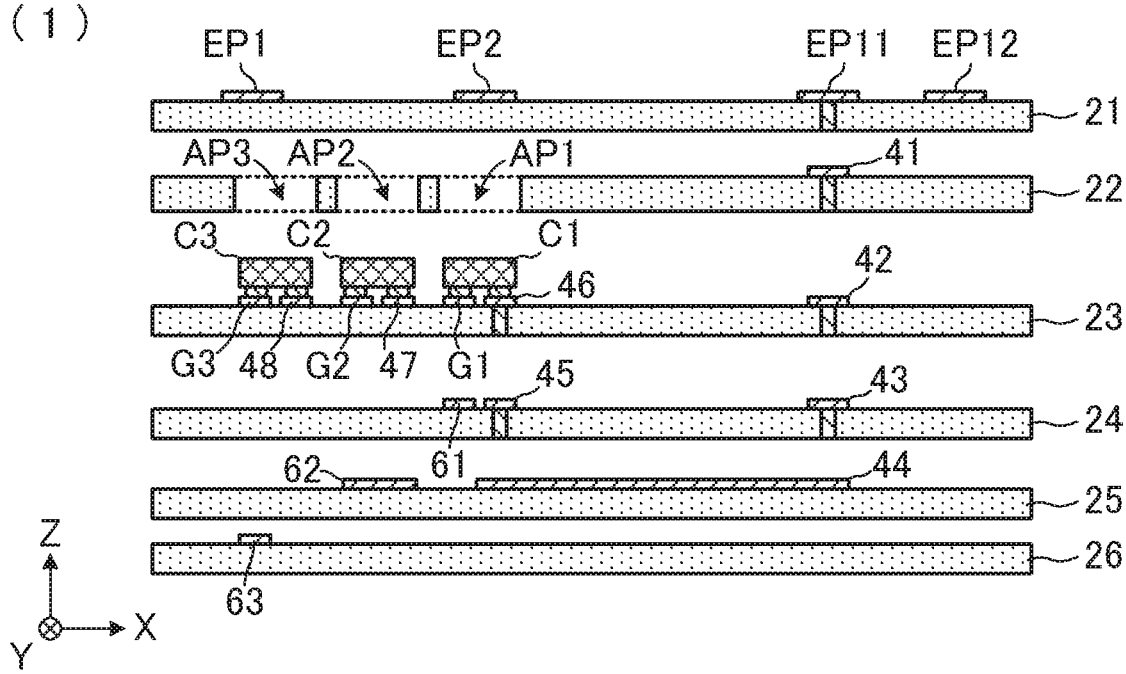
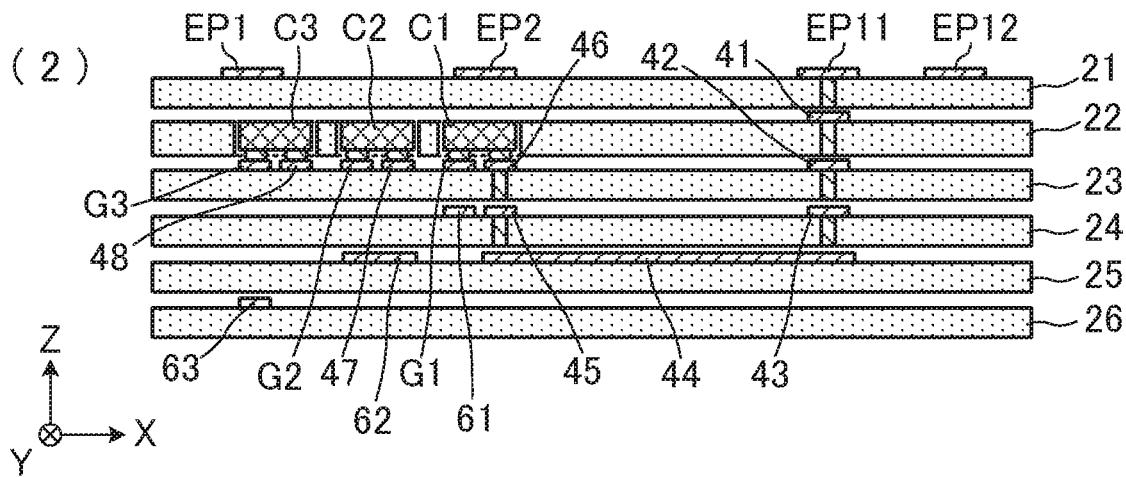
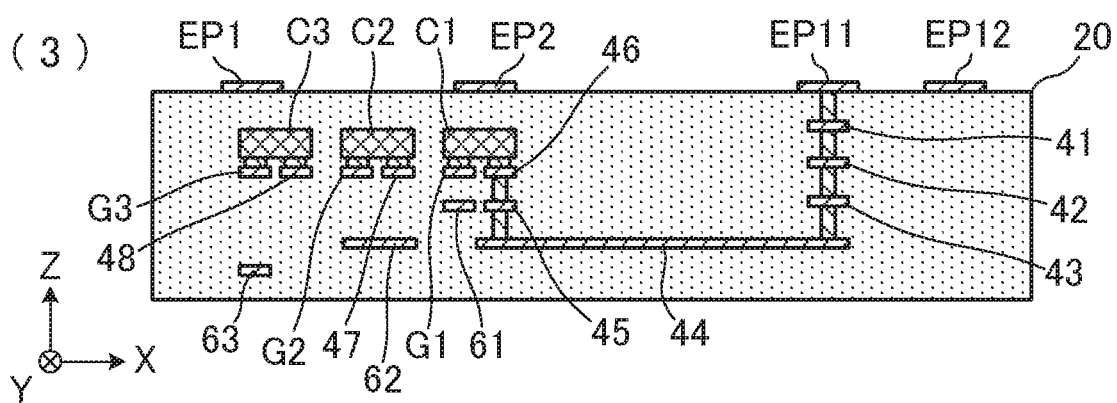

ACTUATOR

CROSS REFERENCE TO RELATED APPLICATIONS

This application claims the benefit of priority to Japanese Patent Application No. 2017-149573 filed on Aug. 2, 2017 and is a Continuation Application of PCT Application No. PCT/JP2018/028388 filed on Jul. 30, 2018. The entire contents of each application are hereby incorporated herein by reference.

BACKGROUND OF THE INVENTION

1. Field of the Invention

The present invention relates to an actuator, and particularly, to an actuator that moves one of a coil and a magnet that interact with each other.

2. Description of the Related Art

Various types of actuators are known to include a coil and are driven by electromagnetic force. For example, Japanese Unexamined Patent Application Publication No. 2016-191849 discloses an actuator which includes a coil substrate unit including a coil and a base substrate unit including a coil driving circuit for driving the coil. This actuator is configured to move a movable body including a magnet, using a magnetic field generated by the coil.

When wiring is densely formed in contact with the base substrate unit for space saving or other purposes, non-connection wiring that is not connected to the coil may be disposed near the coil. Then, a magnetic field (noise) from this non-connection wiring may interfere with a magnetic field generated by the coil.

SUMMARY OF THE INVENTION

Preferred embodiments of the present invention provide actuators that each reduce the effect of noise from non-connection wiring that is not connected to the coil, the non-connection wiring being provided in contact with the base substrate, and reduce characteristic variations.

An actuator according to a preferred embodiment of the present invention includes a coil substrate including a coil; a base substrate including a coil driving circuit, the base substrate including a plurality of insulating base layers that are stacked; a capacitor disposed in contact with the base substrate; and a magnet to receive a magnetic field generated by the coil. The base substrate includes a first region closer to the coil and a second region farther from the coil. The first and second regions are defined by dividing a portion of the base substrate into two portions in a direction in which the insulating base layers are stacked, the portion overlapping the coil as viewed in a winding axis direction of the coil. The capacitor is located in the first region more densely than in the second region.

A portion including the capacitor disposed therein provides a large capacitance and thus has a higher volume density of conductors than the other portion. Therefore, when a capacitor with a high volume density of conductors is densely located near the coil (i.e., in the first region of the base substrate), the volume density of the conductors near the coil is increased and this provides effective shielding against noise from the base substrate. Since a capacitor is defined by large-area conductors disposed close to each other, the shielding effect is high. Thus, the configuration described above reduces the effect of noise from the base substrate on the coil, and reduces variations in actuator characteristics.

It is preferable that the actuator further includes non-connection wiring that is not connected to the coil, the non-connection wiring is provided in contact with the base substrate, and that the capacitor is connected between the non-connection wiring and a ground. According to this configuration, since noise superimposed on the non-connection wiring is eliminated (or shunted) by the capacitor disposed near the coil, the effect of noise from the non-connection wiring on the coil is able to be reduced or prevented.

It is preferable that the base substrate includes a ground conductor disposed in the first region or the second region, and that the capacitor is connected to the ground conductor. This configuration enables connection of the capacitor to the ground without requiring long routing, and thus is able to reduce conductor resistance and parasitic inductance in wiring between the capacitor and the ground. This enables the capacitor to more effectively reduce or prevent noise (which is superimposed on the non-connection wiring).

It is preferable that the capacitor has higher stiffness than the insulating base layers and is disposed in a substrate mounting region of the base substrate, the substrate mounting region overlapping the coil substrate as viewed in the winding axis direction. This configuration improves the stiffness of an area near the coil (i.e., substrate mounting region). Therefore, even if external force is applied to the base substrate, the region near the coil is not significantly deformed. That is, this configuration reduces, for example, deformation, positional displacement, and tilt of the coil resulting from deformation of the base substrate, and thus reduces variations in actuator characteristics.

It is preferable that the base substrate includes a flexible portion having flexibility and a connecting portion for external connection, the connecting portion being connected to the flexible portion. This configuration facilitates connection of the connecting portion to another substrate or other suitable structure using the flexibility of the flexible portion (with the flexible portion bent). Also, with this configuration, even if external force is applied to the connecting portion (e.g., another substrate connected to the connecting portion is moved), the resulting stress is not easily transmitted to the coil, the capacitor, and other components. This reduces changes in actuator characteristics caused by the stress transmitted to the coil and others.

Preferred embodiments of the present invention provide actuators that each reduce the effect of noise from non-connection wiring that is not connected to the coil, the non-connection wiring being provided in contact with the base substrate, and reduce characteristic variation.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a cross-sectional view of an actuator according to a first preferred embodiment of the present invention.

FIG. 2 is a cross-sectional view of the actuator according to the first preferred embodiment of the present invention, showing a substrate mounting region.

FIG. 4 is a cross-sectional view of a base substrate according to the first preferred embodiment of the present invention.

FIG. 5 is a cross-sectional view sequentially illustrating a process of manufacturing the coil substrate according to the first preferred embodiment of the present invention.

FIG. 6 is a cross-sectional view sequentially illustrating a process of manufacturing the base substrate according to the first preferred embodiment of the present invention.

DETAILED DESCRIPTION OF THE PREFERRED EMBODIMENTS

Figure 3A:
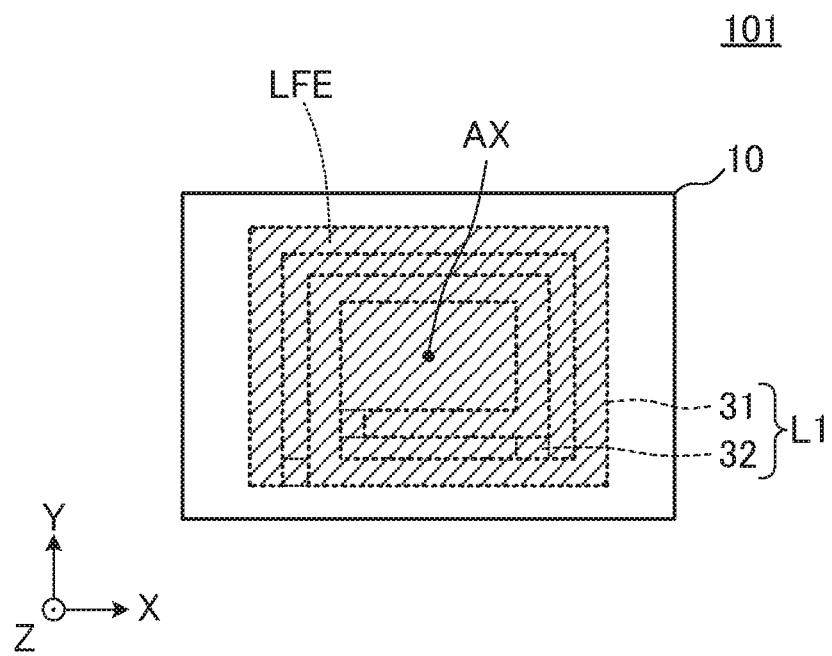
FIG. 3A is a plan view of a coil substrate according to the first preferred embodiment of the present invention.

Preferred embodiments of the present invention will now be described using some specific examples, with reference to the drawings. Throughout the drawings, the same or similar components are denoted by the same reference numerals. Although features of the present invention are described in different preferred embodiments for clarification or ease of understanding, some of the features presented in different preferred embodiments may be replaced or combined. In the second and subsequent preferred embodiments, the description of features that are in common with the first preferred embodiment will be omitted and only differences from the first preferred embodiment will be described. In particular, the same or similar advantageous effects achieved by the same configuration will not be mentioned in each preferred embodiment.

First Preferred Embodiment

Figure 3B:
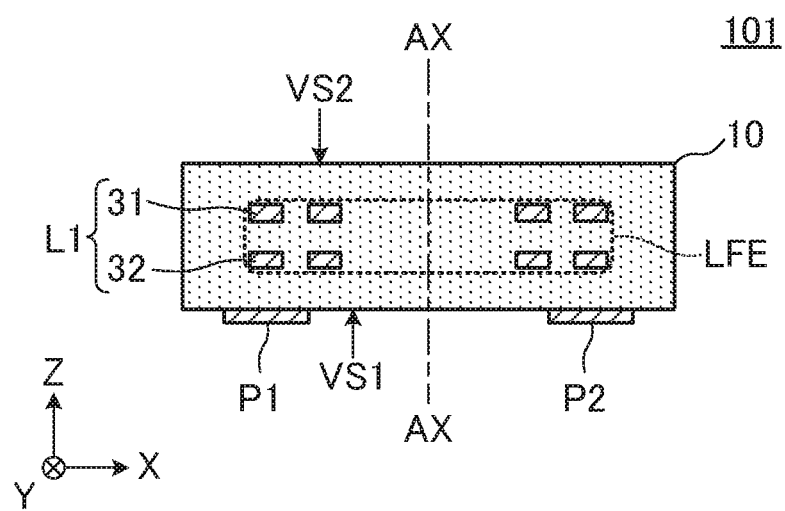
FIG. 3B is a cross-sectional view of the coil substrate.

FIG. 1 is a cross-sectional view of an actuator 401 according to a first preferred embodiment of the present invention. FIG. 2 is a cross-sectional view of the actuator 401, showing a substrate mounting region SME. FIG. 3A is a plan view of a coil substrate 101 according to the first preferred embodiment, and FIG. 3B is a cross-sectional view of the coil substrate 101. FIG. 4 is a cross-sectional view of a base substrate 201 according to the first preferred embodiment. FIGS. 1, 2, 3B, and 4 exaggerate the thickness of each element. The same applies to the other cross-sectional views mentioned below. In FIG. 3A, a coil region LFE is hatched to clarify the structure. FIGS. 1 and 4 show capacitor electrodes CE (inner electrodes) included in capacitors C1, C2, and C3.

As described in detail below, the "actuator" includes a coil substrate including a coil and a base substrate, and is capable of moving a movable body with a magnet attached thereto by using a magnetic field generated by the coil.

The actuator 401 includes the coil substrate 101, the base substrate 201, the capacitors C1, C2, and C3 disposed in the base substrate 201, an integrated circuit (IC) 1, and a magnet 4.

As illustrated in FIGS. 3A and 3B, the coil substrate 101 includes a base 10, a coil L1, and connection electrodes P1 and P2.

The base 10 preferably has, for example, a rectangular or substantially rectangular parallelepiped shape whose longitudinal direction coincides with the X-axis direction. The base 10 includes a first principal surface VS1 and a second principal surface VS2 opposite each other. The base 10 is preferably, for example, a multilayer body including a plurality of insulating base layers made of thermoplastic resin and that are stacked. The base 10 is preferably a rectangular or substantially rectangular parallelepiped member primarily made of, for example, liquid crystal polymer (LCP) or polyetheretherketone (PEEK).

The coil L1 includes about four turns and is provided inside the base 10, for example. The coil L1 has a winding axis AX along the stacking direction of the insulating base layers (i.e., along the Z-axis direction). Specifically, the coil L1 includes coil conductors 31 and 32 and interlayer connection conductors (not shown). The coil conductors 31 and 32 are both preferably rectangular or substantially rectangular spiral conductor patterns including about two turns, for example, provided on different insulating base layers. A first end of the coil conductor 31 is connected to a first end of the coil conductor 32, with an interlayer connection conductor (not shown) therebetween. The coil conductors 31 and 32 are preferably conductor patterns made of, for example, copper (Cu) foil.

The connection electrodes P1 and P2 are preferably rectangular or substantially rectangular conductor patterns provided on the first principal surface VS1 of the base 10. The connection electrode P1 is connected to a first end of the coil L1 (or second end of the coil conductor 31), and the connection electrode P2 is connected to a second end of the coil L1 (or second end of the coil conductor 32). The connection electrodes P1 and P2 are preferably made of, for example, Cu foil.

As illustrated in FIG. 4, the base substrate 201 includes a base 20, connection electrodes EP1, EP2, EP11, and EP12, conductor patterns 41, 42, 43, 44, 45, 46, 47, 48, 61, 62, and 63, ground conductors G1, G2, and G3, and interlayer connection conductors. The base substrate 201 includes a coil driving circuit to drive the coil L1.

The base 20 preferably has a rectangular or substantially rectangular parallelepiped shape whose longitudinal direction coincides with the X-axis direction. The base 20 is preferably a multilayer body including a plurality of insulating base layers of thermoplastic resin that are stacked. The base 20 is preferably a rectangular or substantially rectangular parallelepiped member primarily made of, for example, liquid crystal polymer (LCP) or polyetheretherketone (PEEK).

The connection electrodes EP1, EP2, EP11, and EP12 are conductor patterns provided on the surface (or upper surface in FIG. 4) of the base 20. The conductor patterns 41, 42, 43, 44, 45, 46, 47, 48, 61, 62, and 63 and the ground conductors G1, G2, and G3 are conductor patterns provided inside the base 20. As illustrated in FIG. 1, the conductor patterns 46, 47, and 48 and the ground conductors G1, G2, and G3 are disposed in a first region F1 (described in detail below). The conductor patterns 45, 61, 62, and 63 are disposed in a second region F2 (described in detail below). The connection electrodes EP1, EP2, EP11, and EP12, the conductor patterns 41, 42, 43, 44, 45, 46, 47, 48, 61, and 62, and the ground conductors G1, G2, and G3 are preferably made of, for example, Cu foil.

As illustrated in FIG. 4 and other figures, the connection electrode EP11 is connected to the conductor pattern 46, with the interlayer connection conductors and the conductor patterns 41, 42, 43, 44, and 45 inside the base 20 therebetween. Although not shown, wiring defined by the connection electrode EP11, the conductor patterns 41, 42, 43, 44, 45, and 46, and the interlayer connection conductors is not connected to the coil L1. Also, the conductor patterns 47 and 48 are not connected to the coil L1.

In the present preferred embodiment, the wiring defined by the connection electrode EP11, the conductor patterns 41, 42, 43, 44, 45, and 46, and the interlayer connection conductors is an example of "non-connection wiring".

The capacitors C1, C2, and C3 are disposed inside the base 20 and have different frequency characteristics. The capacitors C1, C2, and C3 have higher stiffness than the insulating base layers of the base 20. The capacitor C1 is connected to the conductor pattern 46 and the ground conductor G1 by a conductive bonding material, such as solder, for example. The capacitor C2 is connected to the conductor pattern 47 and the ground conductor G2 by a conductive bonding material, such as solder, for example. The capacitor C3 is connected to the conductor pattern 48 and the ground conductor G3 by a conductive bonding material, such as solder, for example. Although not shown, the capacitors C1, C2, and C3 are each shunt-connected between the non-connection wiring and the ground. The capacitors C1, C2, and C3 are preferably, for example, multilayer ceramic capacitors each including a base having higher stiffness than the insulating base layers of the base 20.

As illustrated in FIG. 1, the coil substrate 101 is mounted on the base substrate 201. Specifically, the connection electrodes P1 and P2 of the coil substrate 101 are connected to the connection electrodes EP1 and EP2, respectively, of the base substrate 201 by a conductive bonding material, such as solder, for example. The IC 1 is mounted on the base substrate 201. Specifically, terminals of the IC 1 are connected to the connection electrodes EP11 and EP12 of the base substrate 201 by a conductive bonding material, such as solder, for example. The IC 1 may preferably be, for example, a microprocessor chip or a power supply circuit module.

As illustrated in FIG. 1, the base substrate 201 includes the first region F1 and the second region F2. Specifically, when a portion of the base substrate 201 (base 20) overlapping the coil region LFE, as viewed in the direction of the winding axis AX of the coil L1 (i.e., in the Z-axis direction), is divided into two in the stacking direction of the insulating base layers of the base 20 (i.e., in the Z-axis direction), that is, when the above-described portion of the base substrate 201 is divided by a division plane MS in FIG. 1, the first region F1 of the present preferred embodiment is a region closer to the coil L1 and the second region F2 of the present preferred embodiment is a region farther from the coil L1.

In the present preferred embodiment, the base 20 is divided into two, at the center or approximate thereof, by the division plane MS in the Z-axis direction. However, the position at which the base 20 is divided into two is not limited to this. The base 20 may be divided into two by the division plane MS at any position in the Z-axis direction. Thus, the thickness of the first region F1 in the Z-axis direction may differ from the thickness of the second region F2 in the Z-axis direction.

As illustrated in FIG. 1, the capacitors C1, C2, and C3 are disposed in the first region F1 more densely (at higher volume density) than in the second region F2. As illustrated in FIG. 2, the capacitors C1, C2, and C3 are disposed in the substrate mounting region SME. The substrate mounting region SME is a portion of the base substrate 201 (base 20) overlapping the coil substrate 101 as viewed in the direction of the winding axis AX (i.e., in the Z-axis direction).

The magnet 4 is attached to a movable body (not shown). The magnet 4 is disposed opposite the base substrate 201 (i.e., on the positive side of the base substrate 201 in the Z-axis direction), with the coil substrate 101 interposed therebetween. The magnet 4 is preferably, for example, a permanent magnet.

The actuator 401 is used, for example, in the following manner. When a predetermined current is passed through the coil L1, the magnet 4 is displaced in the planar direction (e.g., in the X-axis direction) by a magnetic field radiated from the coil L1 (see, the open arrow in FIG. 1).

The actuator 401 of the present preferred embodiment has the following advantageous effects.

A portion including the capacitors C1, C2, and C3 disposed therein provides a large capacitance and thus has a higher volume density of conductors than the other portion. Therefore, when, as in the present preferred embodiment, the capacitors C1, C2, and C3 with a high volume density of conductors are densely located near the coil L1 (i.e., in the first region F1 of the base substrate 201), the volume density of conductors near the coil L1 is increased and this provides effective shielding against noise from the base substrate 201 (e.g., noise from the conductor patterns 61, 62, and 63). Since a capacitor is defined by large-area conductors disposed close to each other, the shielding effect is high. The configuration described above thus reduces the effect of noise from the base substrate 201 on the coil L1 and reduces variations in actuator characteristics.

Although the capacitors C1, C2, and C3 are multilayer ceramic capacitors in the present preferred embodiment, the configuration is not limited to this. For example, the capacitors C1, C2, and C3 may include a plurality of conductor patterns in contact with the base 20 of the base substrate 201.

In the present preferred embodiment, the capacitors C1, C2, and C3 are connected between the ground and the non-connection wiring that is not connected to the coil L1. According to this configuration, since noise superimposed on the non-connection wiring is eliminated (or shunted) by the capacitors C1, C2, and C3 disposed near the coil L1, the effect of noise from the non-connection wiring with respect to the coil L1 is able to be reduced or prevented.

In the present preferred embodiment, the capacitors C1, C2, and C3 disposed in the first region F1 are respectively connected to the ground conductors G1, G2, and G3 disposed near the coil L1 (i.e., disposed in the first region F1). This configuration enables connection of the capacitors C1, C2, and C3 to the ground without requiring long routing, and thus reduces conductor resistance and parasitic inductance in wiring between the capacitors C1, C2, and C3 and the ground. This enables the capacitors C1, C2, and C3 to more effectively eliminate noise (which is superimposed on the non-connection wiring).

The present preferred embodiment provides the capacitors C1, C2, and C3 having different frequency characteristics. This configuration enables reduction or prevention of noise of various frequencies, and thus achieves a noise reduction or prevention effect over a wide frequency band.

In the present preferred embodiment, the capacitors C1, C2, and C3, each including a base having higher stiffness than the insulating base layers of the base 20, are disposed in the substrate mounting region SME of the base substrate 201. The substrate mounting region SME overlaps the coil substrate 101 as viewed in the direction of the winding axis AX (i.e., in the Z-axis direction). This configuration makes the stiffness of an area near the coil L1 (i.e., substrate mounting region SME) higher than that in the case of capacitors defined by a plurality of conductor patterns in contact with the base 20 of the base substrate 201. Therefore, even if external force is applied to the base substrate 201, the area near the coil L1 is not significantly deformed. That is, this configuration reduces, for example, deformation, positional displacement, and tilt of the coil L1 resulting from deformation of the base substrate 201, and thus reduces variations in actuator characteristics.

The capacitors C1, C2, and C3 each preferably include a base having a dielectric constant higher than that of the base 20 of the base substrate 201. With this configuration, as compared to the case in which capacitors of the same capacitance is defined by a plurality of conductor patterns in contact with the base 20 of the base substrate 201, it is easier to downsize the capacitors C1, C2, and C3 embedded as components in the base substrate 201, and thus to reduce the overall thickness of the base substrate 201.

It is preferable, as in the present preferred embodiment, that the capacitors C1, C2, and C3 are multilayer capacitors and that the thickness of the insulating layers of the base of each of the capacitors C1, C2, and C3 is thinner than the thickness of the insulating base layers of the base 20. Providing the capacitors C1, C2, and C3 with a plurality of conductor patterns in contact with the base 20 increases the number of insulating base layers stacked to define the base 20, and thus increases the number of manufacturing steps and the cost involved in the manufacture. In contrast, with the configuration described above, it is not necessary to increase the number of insulating base layers stacked to define the base 20, and thus reduces the number of steps and cost of manufacture. Also, this configuration makes the size (thickness) of the base substrate 201 smaller than that in the case of providing the capacitors C1, C2, and C3 with a plurality of conductor patterns in contact with the base 20. Additionally, this configuration makes the distances between the capacitor electrodes included in the capacitors C1, C2, and C3 smaller than in the case of providing the capacitors C1, C2, and C3 with a plurality of conductor patterns in contact with the base 20, and thus improves the noise shielding effect.

In the present preferred embodiment, as illustrated in FIGS. 1 and 4, the capacitor electrodes CE (inner electrodes) included in the capacitors C1, C2, and C3 each include a surface that faces in the direction (the Z-axis direction) in which the coil L1 is located relative to the base substrate 201. This configuration enables the capacitors C1, C2, and C3 to provide the coil L1 with more effective shielding.

It is preferable, as in the present preferred embodiment, that the adjacent capacitors C1, C2, and C3 overlap, as viewed from a side surface of the base substrate 201 (i.e., as viewed in the X-axis or Y-axis direction). It is more preferable that the adjacent capacitors C1, C2, and C3 are disposed at the same position in the stacking direction (the Z-axis direction) of the insulating base layers of the base 20, that is, adjacent capacitors C1, C2 and C3 are disposed in the same plane (XY-plane). This configuration enables the capacitors C1, C2, and C3 to more effectively shield noise from the base substrate 201 and further improves the shielding effect.

In the present preferred embodiment, the base 10 of the coil substrate 101 and the base 20 of the base substrate 201 are preferably primarily made of the same material (liquid crystal polymer). This configuration enables the base 10 of the coil substrate 101 and the base 20 of the base substrate 201 to have the same or substantially the same coefficient of linear expansion. This reduces the occurrence of warpage caused by a difference in coefficient of linear expansion between the base 10 and the base 20 resulting from temperature changes during (or after) mounting of the coil substrate 101 onto the base substrate 201. This configuration thus reduces the occurrence of bonding failure between the connection electrodes P1 and P2 of the coil substrate 101 and the connection electrodes EP1 and EP2 of the base substrate 201.

In the present preferred embodiment, the base 10 is preferably a multilayer body including a plurality of insulating base layers that are stacked, and the coil L1 includes the coil conductors 31 and 32 provided on two or more insulating base layers. When the coil L1 includes the coil conductors 31 and 32 individually provided on two or more insulating base layers, the insulating base layers (coil conductors) need to be stacked together with high positional accuracy, so as to prevent deviations from desired coil characteristics. Therefore, if the coil substrate and the base substrate are integrally provided in one base, the ratio of non-defective products is reduced. In the actuator 401 of the present preferred embodiment, however, the coil substrate 101, which requires high positional accuracy when stacking the layers, and the base substrate 201 are separate bodies. With this configuration, therefore, the ratio of non-defective actuators is higher than that when the coil substrate and the base substrate are integrally provided (i.e., the coil substrate and the base substrate are provided in one base).

The coil substrate 101 of the present preferred embodiment is manufactured, for example, in the following non-limiting example process. FIG. 5 is a cross-sectional view sequentially illustrating a process of manufacturing the coil substrate 101. Although FIG. 5 illustrates a process of making a single chip (individual piece) for convenience of explanation, a process for manufacturing multilayer substrates, in practice, is performed on collective boards.

First, as illustrated in portion (1) of FIG. 5, a plurality of insulating base layers 11, 12, and 13 are prepared. The insulating base layers 11, 12, and 13 are preferably thermoplastic resin sheets, such as liquid crystal polymer (LCP) sheets or polyetheretherketone (PEEK) sheets, for example.

Next, the coil conductors 31 and 32 and the connection electrodes P1 and P2 are formed on the insulating base layers 11, 12, and 13. Specifically, the insulating base layers 11, 12, and 13, each being in a collective board, are laminated on one side thereof with metal foil (e.g., Cu foil), which is then patterned by photolithography. Thus, the coil conductor 31 is formed on the insulating base layer 11 in the collective board, the coil conductor 32 is formed on the insulating base layer 12 in the collective board, and the connection electrodes P1 and P2 are formed on the insulating base layer 13 in the collective board.

Interlayer connection conductors are formed in the insulating base layers 12 and 13. The interlayer connection conductors are made by forming through-holes in the insulating base layers 12 and 13 with a laser beam or other suitable method, applying (or charging) a conductive paste preferably including, for example, at least one of Cu and tin (Sn) or their alloy into the through-holes, and hardening the conductive paste by application of heat and pressure in the subsequent step. Therefore, a material used to form the interlayer connection conductors has a melting point (melting temperature) lower than the temperature during the application of heat and pressure in the subsequent step.

Next, as illustrated in portion (2) of FIG. 5, the insulating base layers 13, 12, and 11 are stacked in this order. The insulating base layers 11, 12, and 13 are then subjected to heat and pressure to form the base 10 in the resulting collective board. This process allows the coil conductors 31 and 32 to be connected by the interlayer connection conductors (not shown), and thus enables the coil conductors 31 and 32 and the interlayer connection conductors to form the coil L1.

Last, the collective board is divided into individual pieces to obtain the coil substrate 101 illustrated in portion (3) of FIG. 5.

The base substrate 201 of the present preferred embodiment is manufactured, for example, in the following non-limiting example process. FIG. 6 is a cross-sectional view sequentially illustrating a process of manufacturing the base substrate 201. Although FIG. 6 illustrates a process of making a single chip (individual piece) for convenience of explanation, a process for manufacturing multilayer substrates, in practice, is performed on collective boards.

First, as illustrated in portion (1) of FIG. 6, a plurality of insulating base layers 21, 22, 23, 24, 25, and 26 are prepared. The insulating base layers 21, 22, 23, 24, 25, and 26 are preferably thermoplastic resin sheets, such as liquid crystal polymer (LCP) sheets or polyetheretherketone (PEEK) sheets, for example.

Next, the connection electrodes EP1, EP2, EP11, and EP12 and the conductor patterns 41, 42, 43, 44, 45, 46, 47, 48, 61, 62, and 63 are formed on the insulating base layers 21, 22, 23, 24, 25, and 26.

Specifically, the insulating base layers 21, 22, 23, 24, 25, and 26, each being in a collective board, are laminated on one side thereof with metal foil (e.g., Cu foil), which is then patterned by photolithography. Thus, the connection electrodes EP1, EP2, EP11, and EP12 are formed on the insulating base layer 21 in the collective board, the conductor pattern 41 is formed on the insulating base layer 22 in the collective board, and the conductor patterns 42, 46, 47, and 48 and the ground conductors G1, G2, and G3 are formed on the insulating base layer 23 in the collective board. Also, the conductor patterns 43, 45, and 61 are formed on the insulating base layer 24 in the collective board, the conductor patterns 44 and 62 are formed on the insulating base layer 25 in the collective board, and the conductor pattern 63 is formed on the insulating base layer 26 in the collective board.

Interlayer connection conductors are formed in the insulating base layers 21, 22, 23, and 24. The insulating base layers are made by forming through-holes in the insulating base layers 21, 22, 23, and 24 with a laser beam or other suitable method, applying (or charging) a conductive paste including, for example, at least one of Cu and Sn or their alloy into the through-holes, and hardening the conductive paste by application of heat and pressure in the subsequent step. Therefore, a material used to form the interlayer connection conductors has a melting point (melting temperature) lower than the temperature during the application of heat and pressure in the subsequent step.

Additionally, apertures AP1, AP2, and AP3 are formed in the insulating base layer 22. The apertures AP1, AP2, and AP3 are through-holes conforming to the planar shape of the capacitors C1, C2, and C3. The apertures AP1, AP2, and AP3 are formed, for example, by laser processing. The apertures AP1, AP2, and AP3 may be punched using a die.

After the conductor patterns 46, 47, and 48 and the ground conductors G1, G2, and G3 are formed on the insulating base layer 23, the capacitors C1, C2, and C3 are mounted on the insulating base layer 23. Specifically, outer electrodes of the capacitor C1 are individually connected by a conductive bonding material to the conductor pattern 46 and the ground conductor G1, outer electrodes of the capacitor C2 are individually connected by a conductive bonding material to the conductor pattern 47 and the ground conductor G2, and outer electrodes of the capacitor C3 are individually connected by a conductive bonding material to the conductor pattern 48 and the ground conductor G3. The conductive bonding material may melt during application of heat and pressure in the subsequent step and this may cause poor connection. It is preferable, therefore, that the conductive bonding material is a material that has a melting point (melting temperature) higher than the temperature during the application of heat and pressure.

Next, as illustrated in portion (2) of FIG. 6, the insulating base layers 26, 25, 24, 23, 22, and 21 are stacked in this order. This allows cavities conforming to the shape of the capacitors C1, C2, and C3 to be formed inside the stacked insulating base layers 21, 22, and 23, and allows the capacitors C1, C2, and C3 to be fitted into the respective cavities.

After being stacked, the insulating base layers 21, 22, 23, 24, 25, and 26 are subjected to heat and pressure to form the base 20 in the resulting collective board. During formation of the base 20 (i.e., during application of heat and pressure), the insulating base layers 21 and 23 partially flow into the cavities. The capacitors C1, C2, and C3 are thus coated with thermoplastic resin.

Last, the collective board is divided into individual pieces to obtain the base substrate 201 illustrated in portion (3) of FIG. 6.

The above-described manufacturing method, in which a plurality of insulating base layers that are stacked are pressed together, facilitates formation of the coil substrate 101 (or base substrate 201), reduces the number of worker-hours required for the manufacture, and keeps the cost low.

Second Preferred Embodiment

A second preferred embodiment of the present invention describes an example in which the base substrate includes a flexible portion.

Figure 7:
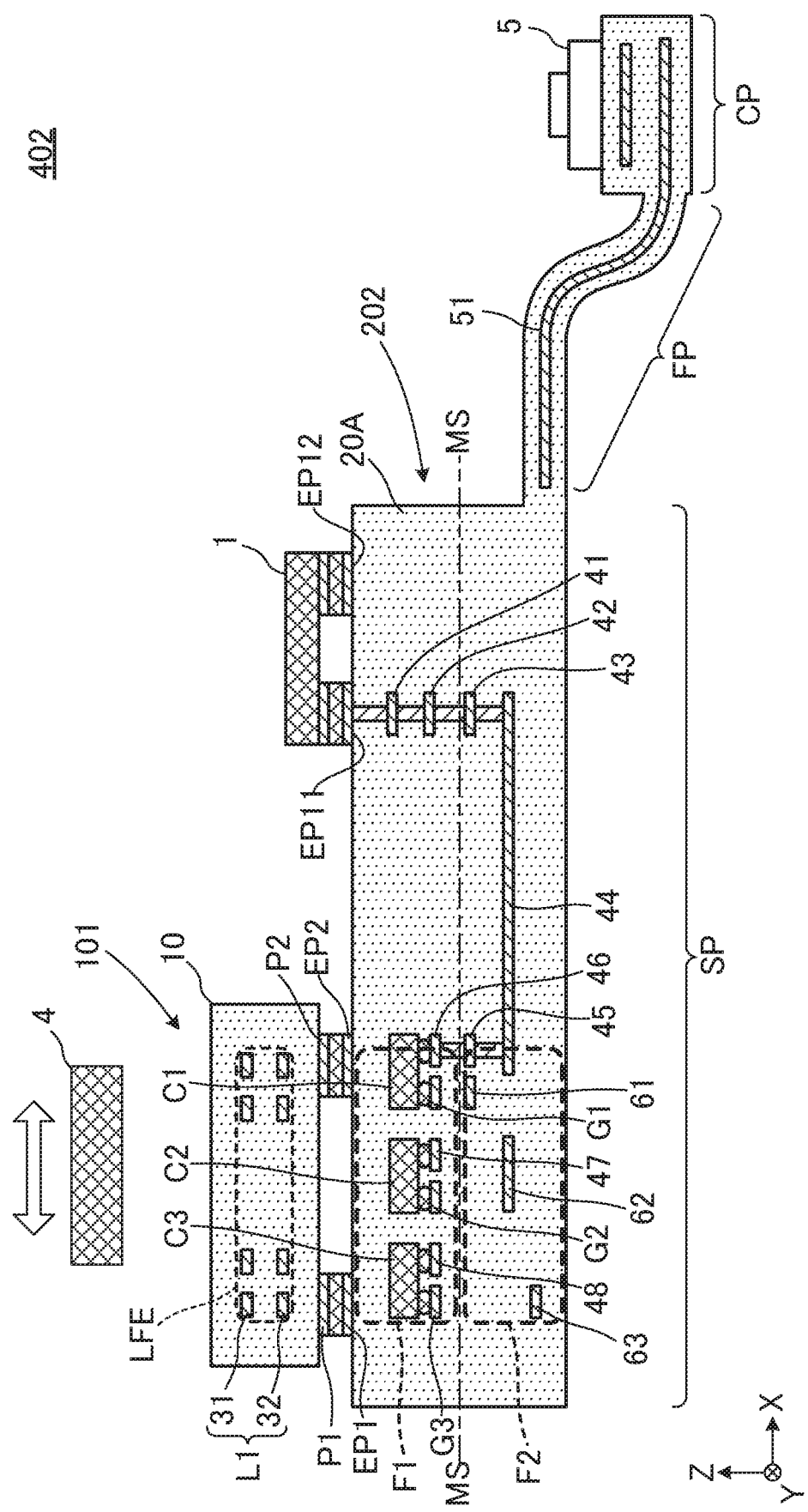
FIG. 7 is a cross-sectional view of an actuator according to a second preferred embodiment of the present invention.

FIG. 7 is a cross-sectional view of an actuator 402 according to a second preferred embodiment.

The actuator 402 includes the coil substrate 101, a base substrate 202, the capacitors C1, C2, and C3 disposed in the base substrate 202, the IC 1, and the magnet 4. The coil substrate 101, the capacitors C1, C2, and C3, the IC 1, and the magnet 4 are the same or substantially the same as those described in the first preferred embodiment.

The structure of the base substrate 202 of the actuator 402 differs from that of the base substrate 201 of the first preferred embodiment. Otherwise, the actuator 402 is configured in the same or substantially the same manner as the actuator 401.

Differences from the actuator 401 of the first preferred embodiment will now be described.

The base substrate 202 differs from the base substrate 201 of the first preferred embodiment in that it includes a base 20A, a conductor pattern 51, and a plug 5.

The base 20A differs from the base 20 described in the first preferred embodiment in that it includes a flexible portion FP having flexibility, and a connecting portion CP for external connection, connected to the flexible portion FP. Otherwise, the base 20A is configured in the same or substantially the same manner as the base 20.

The number of insulating base layers stacked to define the flexible portion FP of the base 20A is less than the numbers of insulating base layers stacked to define the other portions (i.e., a component mounting portion SP and the connecting portion CP illustrated in FIG. 7). This enables the flexible portion FP to bend more easily than the other portions and allows it to have flexibility.

The conductor pattern 51 is provided inside the base 20A and extends through both of the flexible portion FP and the connecting portion CP. In the connecting portion CP, the plug 5 is mounted on the surface (or upper surface in FIG. 7) of the base 20A.

The actuator 402 of the present preferred embodiment has the following advantageous effects, as well as those described in the first preferred embodiment.

In the present preferred embodiment, the base substrate 202 includes the flexible portion FP having flexibility, and the connecting portion CP for external connection, connected to the flexible portion FP. This configuration facilitates connection of the connecting portion CP to another substrate or other suitable structure using the flexibility of the flexible portion FP (with the flexible portion FP bent).

The configuration described above enables the base substrate 202 to be connected to another substrate or other suitable structure, with the flexible portion FP having flexibility interposed therebetween. Therefore, even if external force is applied to the connecting portion CP (e.g., another substrate connected to the connecting portion CP is moved), the resulting stress is not easily transmitted to the component mounting portion SP and the coil L1. This reduces changes in actuator characteristics caused by the stress transmitted to the coil L1 (i.e., changes in characteristics associated with deformation of the coil L1).

The numbers, positions, and lengths of the flexible portions FP and connecting portions CP are not limited to those described in the present preferred embodiment, and may be appropriately changed, as long as the advantageous effects of preferred embodiments of the present invention are achieved.

Third Preferred Embodiment

A third preferred embodiment of the present invention describes an example in which the coil substrate and the base substrate are integrally provided.

Figure 8:
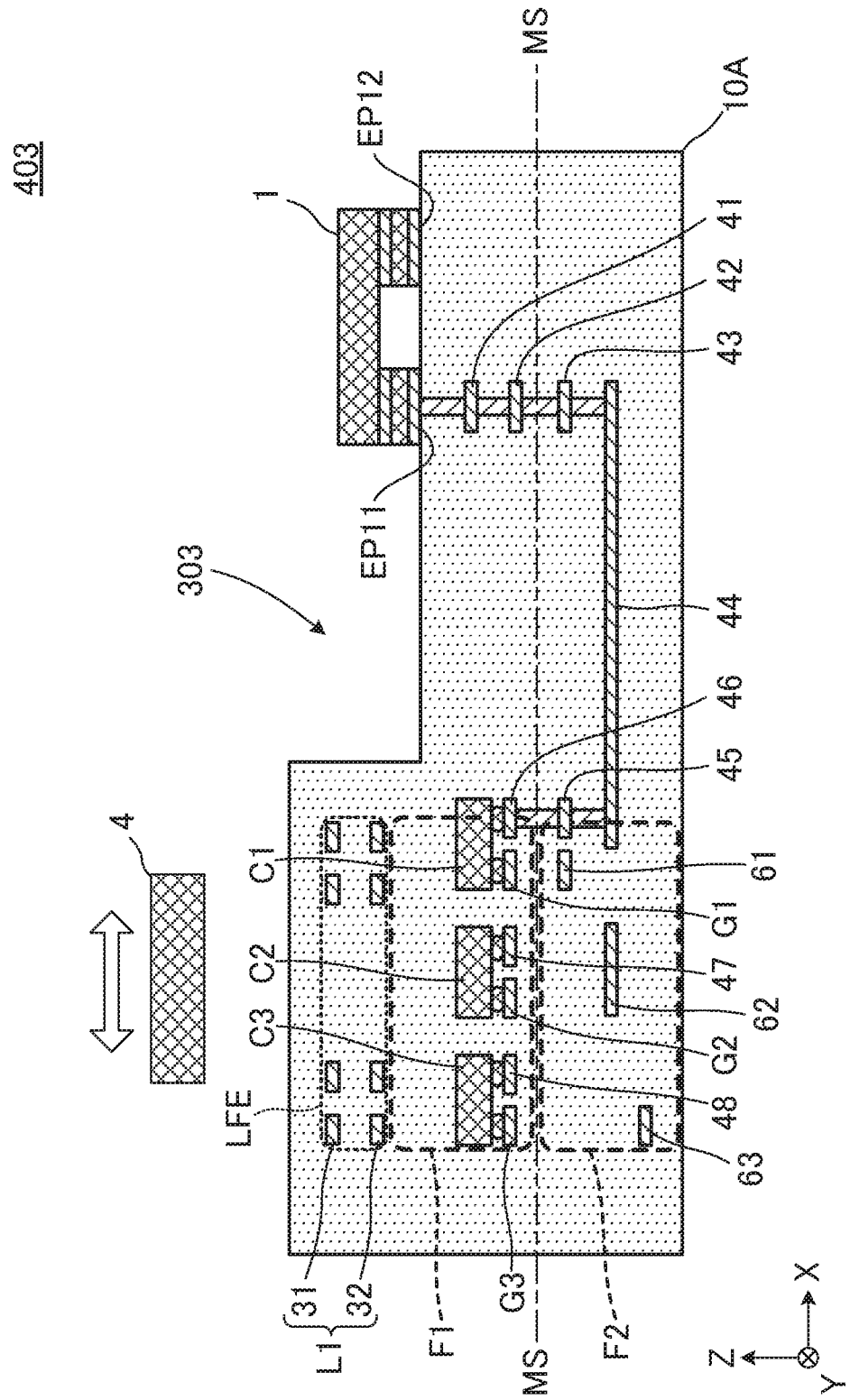
FIG. 8 is a cross-sectional view of an actuator according to a third preferred embodiment of the present invention.

FIG. 8 is a cross-sectional view of an actuator 403 according to a third preferred embodiment of the present invention.

The actuator 403 includes a composite substrate 303, the capacitors C1, C2, and C3 disposed in the composite substrate 303, the IC 1, and the magnet 4. The capacitors C1, C2, and C3, the IC 1, and the magnet 4 are the same or substantially the same as those described in the first preferred embodiment.

The actuator 403 differs from the actuator 401 of the first preferred embodiment in that the coil substrate and the base substrate are provided in one base. Otherwise, the actuator 403 is configured in the same or substantially the same manner as the actuator 401.

Differences from the actuator 401 of the first preferred embodiment will now be described.

The composite substrate 303 includes a base 10A, the coil L1, the connection electrodes EP11 and EP12, the conductor patterns 41, 42, 43, 44, 45, 46, 47, 48, 61, 62, and 63, the ground conductors G1, G2, and G3, and interlayer connection conductors.

The base 10A preferably has, for example, a rectangular or substantially rectangular parallelepiped shape whose longitudinal direction coincides with the X-axis direction. The base 10A is preferably a multilayer body including a plurality of insulating base layers of thermoplastic resin that are stacked. The base 10A is preferably a rectangular or substantially rectangular parallelepiped member primarily made of, for example, liquid crystal polymer (LCP) or polyetheretherketone (PEEK).

The basic configuration of the coil L1, the connection electrodes EP11 and EP12, the conductor patterns 41, 42, 43, 44, 45, 46, 47, 48, 61, 62, and 63, and the ground conductors G1, G2, and G3 is the same or substantially the same as that described in the first preferred embodiment.

In the present preferred embodiment, the coil region LFE (see FIG. 8) of the base 10A corresponds to "coil substrate," and the rest of the base 10A corresponds to "base substrate" of the present invention.

The base 10A includes the first region F1 and the second region F2. Specifically, when a portion of the base substrate overlapping the coil region LFE, as viewed in the direction of the winding axis AX of the coil L1 (i.e., in the Z-axis direction), is divided into two portions in the stacking direction of the insulating base layers of the base 10A (i.e., in the Z-axis direction), that is, when the above-described portion of the base substrate is divided by the division plane MS in FIG. 8, the first region F1 of the present preferred embodiment is a region closer to the coil L1 and the second region F2 of the present preferred embodiment is a region farther from the coil L1.

As illustrated in FIG. 8, the capacitors C1, C2, and C3 are disposed in the first region F1 more densely than in the second region F2.

This configuration provides advantageous effects similar to those achieved by the actuator 401.

Although the base 10 of the coil substrate 101, the base 20 of the base substrate 201, and the base 10A of the composite substrate 303 preferably have a rectangular or substantially rectangular parallelepiped shape in the preferred embodiments described above, the configuration is not limited to this. The shapes of the coil substrate, the base substrate, and the composite substrate may be appropriately changed, as long as the advantageous effects of the present invention are achieved. The base does not necessarily need to have a rectangular or substantially rectangular planar shape, and may be, for example, polygonal, circular, oval, crank-shaped, L-shaped, T-shaped, or Y-shaped.

In the preferred embodiments described above, the bases of the coil substrate, the base substrate, and the composite substrate are multilayer bodies, each include a plurality of insulating base layers of thermoplastic resin that are stacked. However, the configuration is not limited to this. The bases may each include a plurality of insulating base layers of, for example, thermosetting resin, that are stacked. The bases of the coil substrate, the base substrate, and the composite substrate are not limited to multilayer bodies and they may each be, for example, a single-layer body. The number of insulating base layers stacked to define the base may be appropriately changed, as long as the advantageous effects of preferred embodiments of the present invention are achieved.

In the preferred embodiments described above, the coil L1 in contact with the coil substrate is a coil including about four turns having the winding axis AX along the Z-axis direction. However, the number, position, shape, structure, size, and turns (number of turns) of coils are not limited to those described above. The number, shape, structure, and turns (number of turns) of coils may be appropriately changed, as long as the advantageous effects of preferred embodiments of the present invention are achieved. The coil may be, for example, a helical coil in which a plurality of loop-shaped coil conductor patterns are connected by interlayer connection conductors. The outer shape of the coil (as viewed in the direction of the winding axis AX or Z-axis direction) may be appropriately changed, as long as the advantageous effects of preferred embodiments of the present invention are achieved. For example, the coil may have a polygonal, a circular, or an oval outer shape. Also, the winding axis AX of the coil does not necessarily need to exactly coincide with the Z-axis direction.

Although the coil L1 is provided inside the base in the preferred embodiments described above, the configuration is not limited to this. The coil may be partially provided on the surface of the base.

Although the coil L1 includes the coil conductors 31 and 32 individually provided on two insulating base layers (see FIG. 5) in the preferred embodiments described above, the configuration is not limited to this. The coil may be defined, for example, by a single coil conductor. The coil may include, for example, two coil conductors provided on both sides of a single insulating base layer. The coil may include, for example, three or more coil conductors individually provided on three or more insulating base layers.

The circuit configuration of the coil substrate and the circuit configuration of the base substrate are not limited to those in the preferred embodiments described above. The circuit configuration of the coil substrate and the circuit configuration of the base substrate may be appropriately changed, as long as the advantageous effects of the present invention are achieved. That is, mount components other than the IC 1 and the capacitors C1, C2, and C3 may be mounted in or on the coil substrate and the base substrate. Additionally, for example, capacitors defined by conductor patterns or various types of transmission lines (e.g., strip lines, microstrip lines, meander lines, and coplanar lines) may be provided in or on the coil substrate and the base substrate.

Although three capacitors C1, C2, and C3 are disposed in the base substrate in the preferred embodiments described above, the configuration is not limited to this. For example, the number, capacitance, and arrangement of capacitors disposed in the base substrate may be appropriately changed, as long as the advantageous effects of the present invention are achieved. That is, a capacitor may be disposed outside the first region F1, as long as the capacitors in the first region F1 are disposed more densely than in the second region F2. The number of capacitors disposed in contact with the base substrate may be one.

Although the capacitors C1, C2, and C3 disposed in the first region F1 are connected to the ground conductors G1, G2, and G3, respectively, disposed in the first region F1 in the preferred embodiments described above, the configuration is not limited to this. For example, a capacitor disposed in the first region F1 may be connected to a ground conductor disposed in the second region F2. To achieve the advantageous effects of enabling the capacitors C1, C2, and C3 to more effectively eliminate noise described above, however, it is preferable that capacitor disposed in the first region F1 be connected to ground conductor disposed in the first region F1.

Although the base of the coil substrate and the base of the base substrate are primarily made of the same or substantially the same material in the first and second preferred embodiments described above, the configuration is not limited to this. That is, the base of the coil substrate and the base of the base substrate may be primarily made of different materials. To achieve the advantageous effects of reducing or preventing the occurrence of bonding failure described above, however, it is preferable that the base of the coil substrate and the base of the base substrate be primarily made of the same or substantially the same material.

The shapes, numbers, and positions of the connection electrodes of the coil substrate, the base substrate, and the composite substrate, are not limited to those described in the preferred embodiments and may be appropriately changed, as long as the advantageous effects of the present invention are achieved. The number of the connection electrodes may be appropriately changed, depending on the circuit configuration in the coil substrate or the base substrate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An actuator comprising:
   a coil substrate including a coil;
   a base substrate including a coil driving circuit, the base substrate including a plurality of insulating base layers that are stacked;
   a capacitor disposed in contact with the base substrate; and
   a magnet to receive a magnetic field generated by the coil; wherein
   the base substrate includes a first region closer to the coil and a second region farther from the coil, the first and second regions being defined by a portion of the base substrate overlapping the coil as viewed in a winding axis direction of the coil divided into two portions in a direction in which the insulating base layers are stacked; and
   the capacitor is located more densely in the first region than in the second region.

2. The actuator according to claim 1, further comprising:
   non-connection wiring that is not connected to the coil, the non-connection wiring being provided in contact with the base substrate; wherein
   the capacitor is connected between the non-connection wiring and a ground.

3. The actuator according to claim 2, wherein
   the base substrate includes a ground conductor disposed in the first region or the second region; and
   the capacitor is connected to the ground conductor.

4. The actuator according to claim 1, wherein the capacitor has higher stiffness than the plurality of insulating base layers and is disposed in a substrate mounting region of the base substrate, the substrate mounting region overlapping the coil substrate as viewed in the winding axis direction.

5. The actuator according to claim 1, wherein the base substrate includes a flexible portion having flexibility and a connecting portion to be connected externally, the connecting portion being connected to the flexible portion.

6. The actuator according to claim 1, wherein the plurality of insulating base layers are made of thermoplastic resin.

7. The actuator according to claim 1, wherein the plurality of insulating base layers are primarily made of liquid crystal polymer or polyetheretherketone.

8. The actuator according to claim 1, wherein the coil includes about four turns provided inside the coil substrate.

9. The actuator according to claim 1, wherein
   the coil includes first and second coil conductors; and
   each of the first and second coil conductors is a rectangular or substantially rectangular spiral conductor pattern including about two turns.

10. The actuator according to claim 9, wherein the first and second coil conductors are made of copper foil.

11. The actuator according to claim 1, wherein the coil substrate and the base substrate are primarily made of a same material.

12. The actuator according to claim 1, wherein the coil substrate and the base substrate are integrally provided in a single base.

13. The actuator according to claim 5, wherein a number of the plurality of insulating base layers in the flexible portions base substrate is less than a number of the insulating base layers in other portions of the base substrate.

14. The actuator according to claim 5, wherein a plug is mounted on a surface of the connection portion.

15. The actuator according to claim 1, wherein the capacitor in the base substrate includes a plurality of capacitors.

16. The actuator according to claim 15, wherein the plurality of capacitors have different frequency characteristics.

* * * * *